US012804068B2

(12) United States Patent
Fang

(10) Patent No.: US 12,804,068 B2
(45) Date of Patent: Nov. 17, 2026

(54) PHONE CASES WITH MAGNETIC AND DISPLAY FUNCTIONS

(71) Applicant: GUANGZHOU LEHMAN BROTHERS ELECTRONIC TECHNOLOGY CO., LTD., Guangzhou (CN)

(72) Inventor: Xiaochun Fang, Guangzhou (CN)

(73) Assignee: GUANGZHOU LEHMAN BROTHERS ELECTRONIC TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 19/175,138

(22) Filed: Apr. 10, 2025

(65) Prior Publication Data

US 2025/0379930 A1 Dec. 11, 2025

(30) Foreign Application Priority Data

Jun. 7, 2024 (CN) ......................... 202421312245.3

(51) Int. Cl.
*H04M 1/02* (2006.01)
*G09G 3/34* (2006.01)

(52) U.S. Cl.
CPC ........ *H04M 1/0283* (2013.01); *G09G 3/3453* (2013.01); *H04M 1/0203* (2025.01); *H04M 1/0266* (2013.01); *G09G 2340/0435* (2013.01)

(58) Field of Classification Search
CPC ........ G09G 3/3453; G09G 2340/0435; H04M 1/0203; H04M 1/0266; H04M 1/0283; H04M 1/185
See application file for complete search history.

(56) References Cited

U.S. PATENT DOCUMENTS

2019/0341957 A1* 11/2019 Coverstone ......... H04M 1/0249
2023/0228290 A1* 7/2023 Hughes ................ F16M 11/041 455/575.8
2025/0151210 A1* 5/2025 Merenda ................ A45C 11/00

* cited by examiner

*Primary Examiner* — Nelson M Rosario
(74) *Attorney, Agent, or Firm* — PORUS IP LLC

(57) ABSTRACT

Embodiments of the present disclosure provide a phone case with magnetic and display functions. The phone case includes a case, a magnetic ring, a display module, and an antenna. A middle of a back side of the case is provided with a first receiving groove for accommodating the magnetic ring, the magnetic ring is disposed in the first receiving groove, a middle of the first receiving groove is also provided with a receiving area for accommodating the display module, and the display module is disposed in the receiving area. The case is provided with the antenna, and the antenna is electrically connected with the display module.

15 Claims, 6 Drawing Sheets

PHONE CASES WITH MAGNETIC AND DISPLAY FUNCTIONS

CROSS-REFERENCE TO RELATED APPLICATIONS

This application claims priority to Chinese Patent Application No. 202421312245.3, filed on Jun. 7, 2024, the entire contents of which are hereby incorporated by reference.

TECHNICAL FIELD

The present disclosure relates to the technical field of digital accessories, and in particular, to phone cases with magnetic and display functions.

BACKGROUND

A magnetic support member is a phone accessory used to fix and support the phone in daily use. With an articulated support member added to the magnetic support member, the magnetic support member still has a support function in non-magnetic applications. A phone case is also a phone accessory used to protect the phone. In order to apply both the magnetic support member and the phone case to the phone at the same time, a product that attaches the magnetic support member to the back of the phone case has been introduced to the market.

Phone cases with magnetic functions are mainly used to protect the phone and provide magnetic capabilities. However, the aesthetic preferences of users are variable. To cater to the variable aesthetic preferences of the users, frequent replacement of phone cases with different styles and patterns becomes necessary. Each replacement entails resource consumption and waste generation, which contradicts the current promotion of sustainable lifestyles.

Therefore, it is desirable to provide a phone case with magnetic and display functions, which has a customizable appearance, so that the user can easily change the style without replacing the entire phone case, thereby realizing both economic and environmental benefits.

SUMMARY

Some embodiments of the present disclosure provide a phone case with magnetic and display functions. The phone case may include a case, a magnetic ring, a display module, and an antenna. A middle of a back side of the case may be provided with a first receiving groove for accommodating the magnetic ring, the magnetic ring may be disposed in the first receiving groove, a middle of the first receiving groove may also be provided with a receiving area for accommodating the display module, and the display module may be disposed in the receiving area. The case may be provided with the antenna, and the antenna may be electrically connected with the display module.

In some embodiments, the receiving area may be a second receiving groove, and the display module may be disposed within the second receiving groove.

In some embodiments, the display module may include a display and a circuit board, the circuit board may be located below the display. The display may be electrically connected with the circuit board, and the antenna may be electrically connected with the circuit board.

In some embodiments, the second receiving groove may be an annular groove, and a shape and a size of the display may match a shape and a size of the second receiving groove, respectively.

In some embodiments, the display may be an e-ink screen.

In some embodiments, a top of the display module may be provided with a protective layer, and a surface of the protective layer may level with a surface of the magnetic ring.

In some embodiments, the case may include a back plate and a side plate provided around a circumference of the back plate, an edge of the back plate may be connected with the side plate, and the antenna may be provided within the back plate.

In some embodiments, the edge of the back plate may be provided with a protrusion, an inner side of the side plate may be provided with a groove matching the protrusion, and the back plate may be interlocked and cooperated with the side plate through the protrusion and the groove.

In some embodiments, the back plate may include an upper back plate and a lower back plate, the antenna may be provided between the upper back plate and the lower back plate, and a connecting hole connecting the receiving area may be provided in the upper back plate.

In some embodiments, a material of the case may include polycarbonate (PC) or acrylic.

In some embodiments, the phone case may further include a micro memory chip and a microprocessor chip, and the micro memory chip may be configured to receive and store display data transmitted by a phone via the antenna. The microprocessor chip may be configured to obtain monitoring data, determine display parameters based on the monitoring data, and generate a parameter regulation instruction based on the display parameters and send the parameter regulation instruction to the display module to control the display module to display content based on the display parameters.

In some embodiments, the display parameters may include a refresh rate of the display module. The microprocessor chip may be further configured to determine the refresh rate based on the monitoring data, a user activity, and a module power.

In some embodiments, the microprocessor chip may be further configured to obtain device data and determine the display parameters based on the device data and the monitoring data.

In some embodiments, the microprocessor chip may be further configured to determine at least one set of display parameters based on data to be displayed, the device data, and the monitoring data.

In some embodiments, the phone case may further include a microprocessor chip. The e-ink screen may be configured to display a target pattern. The microprocessor chip may be further configured to obtain a user preference level and time information and determine the display data based on the user preference level and the time information.

In some embodiments, the microprocessor chip may be further configured to: obtain candidate display data, determine a preference score corresponding to the candidate display data based on the user preference level, the time information, the candidate display data, and the device data through a preference model, the preference model being a machine learning model, and determine the display data based on the preference score.

In some embodiments, inputs to the preference model may further include geographic location information, weather data, and an ambient noise level.

In some embodiments, the preference model may be trained on a remote server and configured in the remote server and/or the microprocessor chip. The microprocessor chip may be further configured to determine a data processing location based on a count of the candidate display data and a user intervention record.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein.

Figure 1:
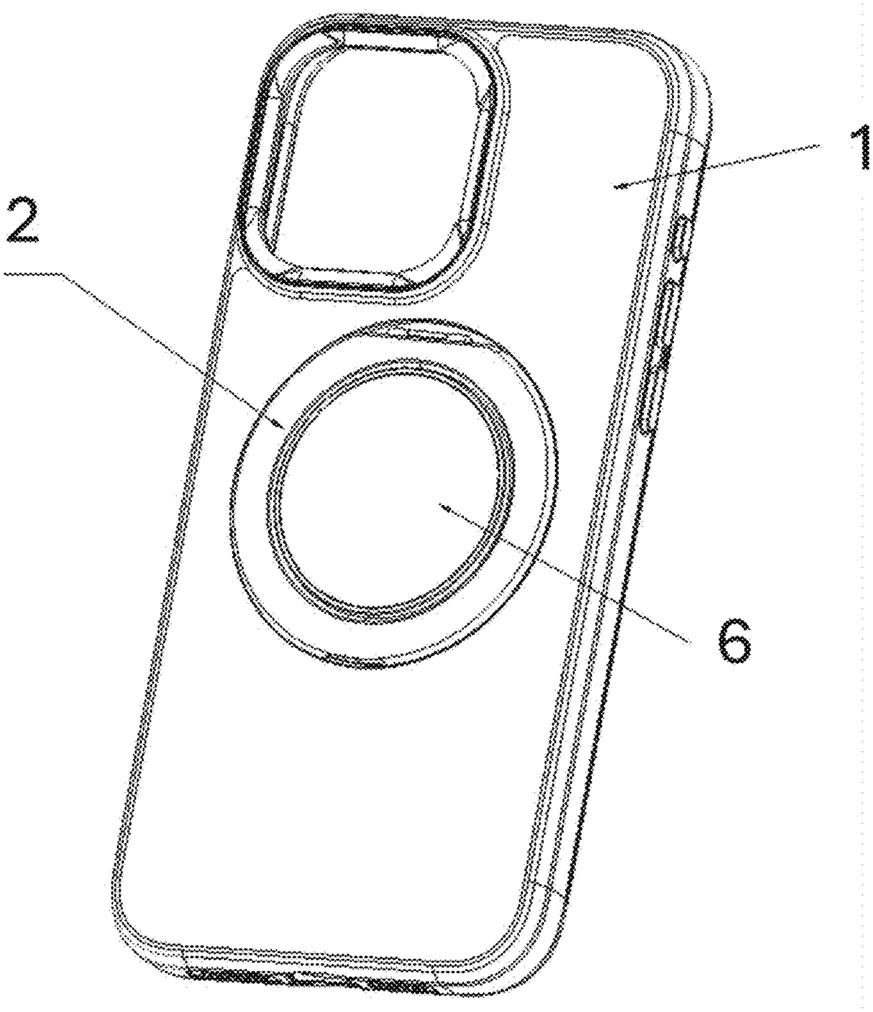
FIG. 1 is a three-dimensional diagram illustrating a phone case with magnetic and display functions according to some embodiments of the present disclosure.

Reference signs: 1—case; 11—back plate; 111—upper back plate; 112—lower back plate; 12—side plate; 2—magnetic ring; 3—display module; 31—display; 32—circuit board; 40—antenna; 51—first receiving groove; 52—second receiving groove; 6—protective layer.

DETAILED DESCRIPTION

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that "system", "device", "unit" and/or "module" as used herein is a manner used to distinguish different components, elements, parts, sections, or assemblies at different levels. However, if other words serve the same purpose, the words may be replaced by other expressions.

As shown in the present disclosure and claims, the words "one", "a", "a kind" and/or "the" are not especially singular but may include the plural unless the context expressly suggests otherwise. In general, the terms "comprise", "comprises", "comprising", "include", "includes", and/or "including", merely prompt to include operations and elements that have been clearly identified, and these operations and elements do not constitute an exclusive listing. The methods or devices may also include other operations or elements.

Some embodiments of the present disclosure provide a phone case with magnetic and display functions (hereinafter referred to as a "phone case").

Figure 2:
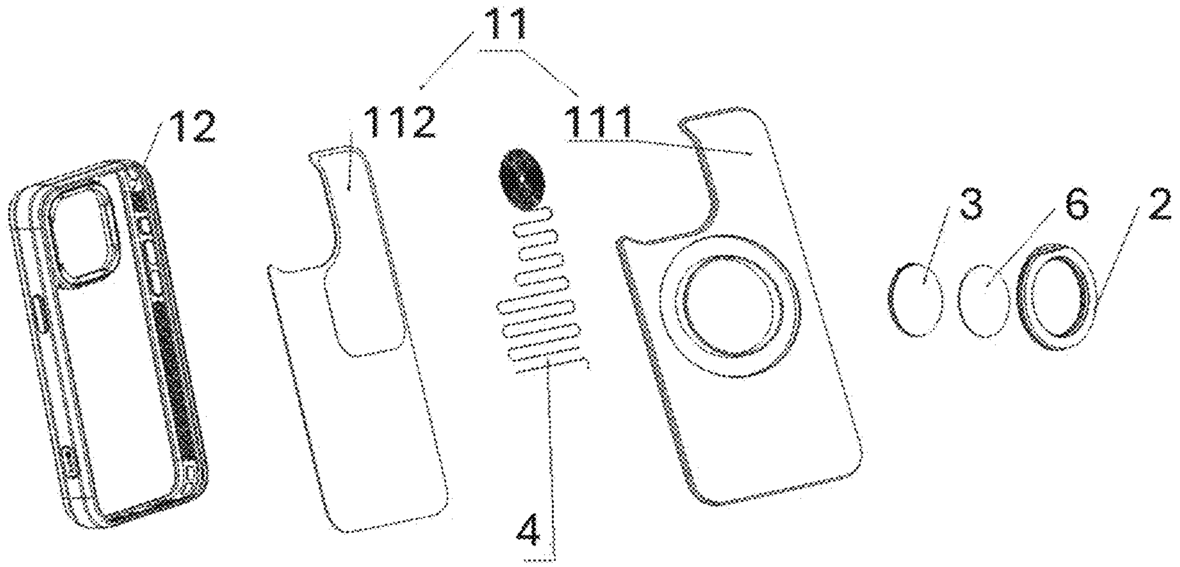
FIG. 2 is an exploded diagram illustrating a phone case with magnetic and display functions according to some embodiments of the present disclosure.
Figure 3:
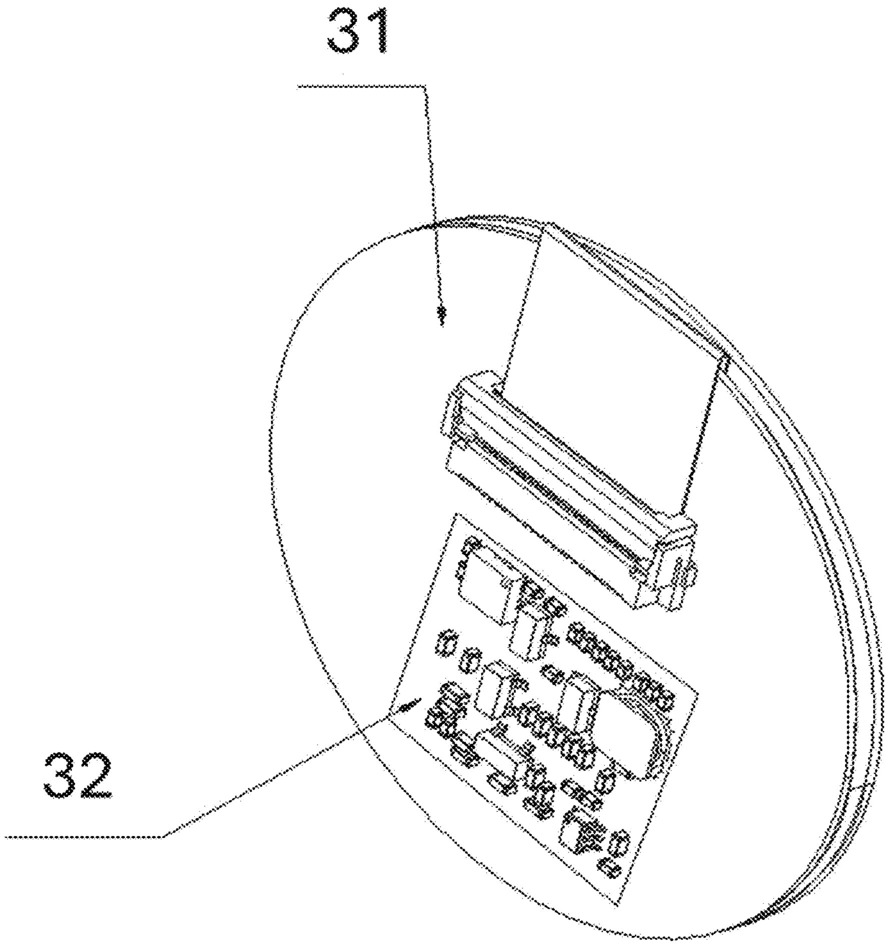
FIG. 3 is a three-dimensional diagram illustrating a display module according to some embodiments of the present disclosure.
Figure 4:
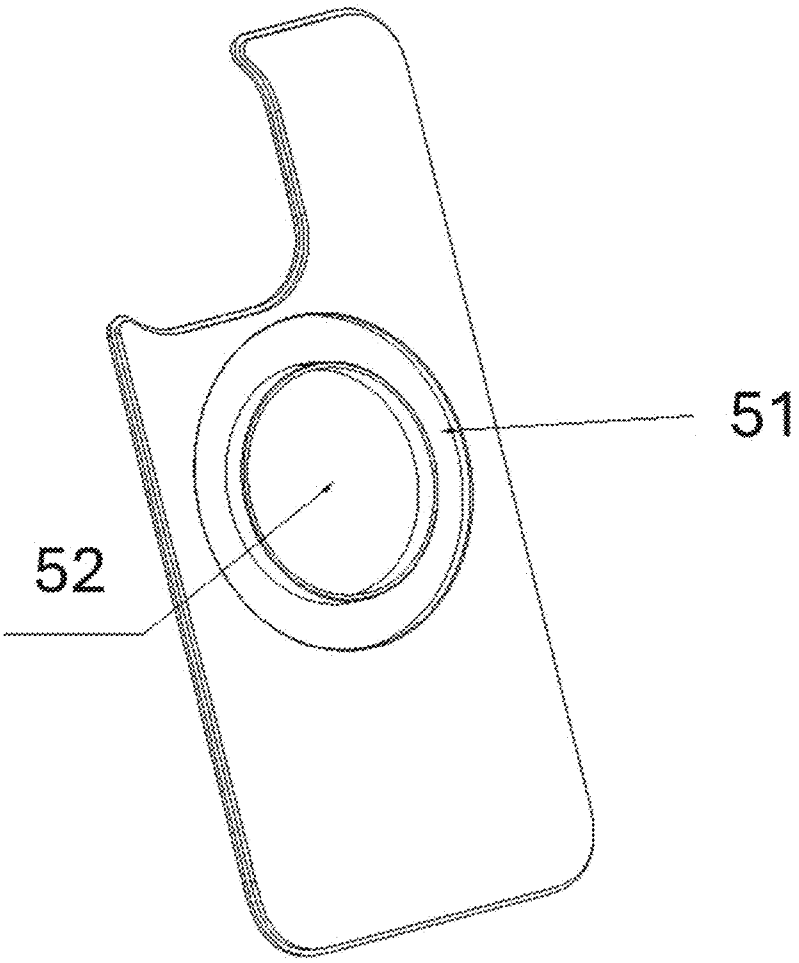
FIG. 4 is a three-dimensional diagram illustrating an upper back plate according to some embodiments of the present disclosure.

FIG. 1 is a three-dimensional diagram illustrating a phone case with magnetic and display functions according to some embodiments of the present disclosure. FIG. 2 is an exploded diagram illustrating a phone case with magnetic and display functions according to some embodiments of the present disclosure. FIG. 3 is a three-dimensional diagram illustrating a display module according to some embodiments of the present disclosure. FIG. 4 is a three-dimensional diagram illustrating an upper back plate according to some embodiments of the present disclosure.

In some embodiments, as shown in FIGS. 1-4, a phone case includes a case 1, a magnetic ring 2, a display module 3, and an antenna 4. A middle of a back side of the case 1 is provided with a first receiving groove 51 for accommodating the magnetic ring 2, and the magnetic ring 2 is disposed in the first receiving groove 51. A middle of the first receiving groove 51 is also provided with a receiving area for accommodating the display module 3, the display module 3 is disposed in the receiving area, the case 1 is provided with the antenna 4, and the antenna 4 is electrically connected with the display module 3.

The case 1 refers to a case used to wrap and protect the side and the back side of a phone. In some embodiments, a hole is opened on the case 1 at a portion facing the front of the phone, the case 1 may protrude or a hole may be opened at a location on a side of the phone that corresponds to buttons (e.g., a shutdown button and a volume button), and a hole is opened on the case 1 at a data cable port (e.g., a charging port and a headphone cable port) on the side of the phone. The front refers to a surface of the case 1 that is parallel and close to a display of the phone, and the side refers to a surface of the case 1 that is perpendicular to the front of the phone. The shape and size of the case 1 may be determined based on an actual size of the phone and the aesthetic demand. More descriptions regarding the case 1 may be found in the related descriptions hereinafter.

The magnetic ring 2 refers to a ring assembly with a magnetic function. In some embodiments, there are a plurality of usages of the magnetic ring 2. For example, a user may attach the magnetic ring 2 to a magnetic car mount, a magnetic desktop mount, or other magnetic mounts to conveniently fix the phone in place while driving, working, or watching a video. As another example, the user may also attach the magnetic ring 2 to a wireless charger to magnetically charge the phone. As yet another example, the user may also attach other magnetic accessories (e.g., a magnetic lens, an expanding battery, etc.) to the magnetic ring 2 to enhance the functionality of the phone. In some embodiments, the magnetic ring 2 may be of a plurality of shapes (e.g., a circular ring, a square ring, etc.). Preferably, the magnetic ring 2 is the circular ring, which may wirelessly charge the phone with a circular wireless charger while realizing the magnetic function.

The first receiving groove 51 refers to a groove accommodating the magnetic ring 2. In some embodiments, the first receiving groove 51 is provided in the middle of the back side of the case 1. The first receiving groove 51 ensures the stability of the magnetic ring 2, and allows the case 1 to remain stable without sliding or tilting, etc., when the case 1 is placed or attached on other magnetic surfaces In some embodiments, the middle of the first receiving groove 51 is also provided with the receiving area for accommodating the display module 3. The receiving area refers to a groove accommodating, fixing, and protecting the display module 3. The display module 3 is provided in the receiving area, which may further enrich the appearance and the functionality of the phone case and provide the user with a function for changing the pattern of the phone case.

In some embodiments, the case 1 is provided with the antenna 4. The antenna 4 refers to a connecting wire that transmits data, electrical energy, or a signal. One end of the antenna 4 may be electrically connected with the display module 3, and the other end of the antenna 4 may be connected with the phone (e.g., a phone data port). The antenna 4 is provided at a preset location inside the case 1 and may transmit data from the phone and display the screen selected on the phone to the display module 3. The preset location may be a location that may be sensed with the phone (e.g., a location where the chip of the phone is located).

In some embodiments of the present disclosure, by setting up the magnetic ring, the display module, and a reasonable antenna layout, the phone case not only satisfies the demand for changing the appearance of the phone case while providing a magnetic support function, but also becomes more practical and beautiful, thereby enhancing the overall user experience.

In some embodiments, the receiving area is a second receiving groove 52, and the display module 3 is disposed within the second receiving groove 52. Understandably, a specific shape of the second receiving groove 52 may be customized according to a shape and a size of the display module 3, to enable the display module 3 to be stably fitted and fixed to the second receiving groove 52. The customized design not only improves the overall aesthetics of the case 1, but also ensures the stability and reliability of the display module 3 when using.

In some embodiments of the present disclosure, the second receiving groove may better protect the display module from damage due to an external impact or friction. In addition, the second receiving groove may provide an additional physical support and cushioning, effectively enhancing the durability of the display module.

The display module 3 refers to a component that converts an electronic signal into visual content. In some embodiments, the display module 3 may display an image, text, video, or other visual information selected by the user.

In some embodiments, as shown in FIG. 3, the display module 3 includes a display 31 and a circuit board 32. The circuit board 32 is located below the display 31, the display 31 is electrically connected with the circuit board 32, and the antenna 4 is electrically connected with the circuit board 32.

In some embodiments, the second receiving groove 52 is annular, and a shape and a size of the display 31 match a shape and a size of the second receiving groove 52, respectively.

In some embodiments, the second receiving groove 52 may also be of other shapes mutually compatible with the display 31. For example, when the display 31 is square, the second receiving groove 52 is a square groove, and the display 31 may be embedded in the second receiving groove 52.

In some embodiments of the present disclosure, by matching the shape and size of the display with the shape and size of the second receiving groove, it may be ensured that the display is embedded in the second receiving groove, which not only enhances the overall aesthetics of the phone case but also enhances the user experience. In addition, the display generates a certain amount of heat during operation, and the annular groove structure may disperse the heat throughout the groove, thereby reducing the temperature of the display, extending the service life of the display, and improving the safety of the phone case.

In some embodiments, the display 31 is an e-ink screen. Understandably, the e-ink screen has a characteristic of low-power consumption, i.e., the e-ink screen consumes almost no power when the display content remains unchanged, which greatly prolongs the standby time of the phone case and reduces the frequency of charging. The power requirement of the phone case may be satisfied by providing a capacitive component on the circuit board. Additionally, the e-ink screen has a clear display and high contrast, and a pattern is visible even in a bright environment outside.

In some embodiments, the display 31 may also be one of a liquid crystal display (LCD) screen, an organic light-emitting diode (OLED) screen, an active-matrix organic light-emitting diode (AMOLED) screen, etc.

In some embodiments, a top of the display module 3 is provided with a protective layer 6, and a surface of the protective layer 6 is level with a surface of the magnetic ring 2.

The protective layer 6 is configured to protect the display from physical damage. In some embodiments, the protective layer 6 may be made of a wear and scratch-resistant material, such as one of glass, polycarbonate (PC), polycarbonate terephthalate (PET), etc. The protective layer 6 may be directly cover the display 31 to effectively prevent the display 31 from physical damage such as a scratch, an impact, etc.

In some embodiments of the present disclosure, the protective layer with the wear and scratch-resistant material, may be used in a long time period without being damaged, which ensure the clarity and integrity of the display and prolongs the service life of the display module, to make the user more peace of mind. The surface of the protective layer is level with the surface of the magnetic ring, which makes the whole phone case neater and more beautiful in appearance. The design not only improves the visual effect of the product but also enhances the user experience.

In some embodiments, as shown in FIG. 2, the case 1 includes a back plate 11 and a side plate 12 provided around a circumference of the back plate 11, an edge of the back plate 12 is connected with the side plate 12, and the antenna 4 is provided within the back plate 11.

The back plate 11 refers to a structure in the case 1 that wraps and protects the back of the phone. The side plate 12 refers to a structure in the case 1 that wraps and protects the sides of the phone. In some embodiments, the materials of the back plate 11 and the side plate 12 may be the same or different. The back plate 11 and the side plate 12 may be interlocked or integrally molded.

In some embodiments of this disclosure, the back plate and the side plate are designed to facilitate the removal and installation of the phone case. When the phone needs to be replaced or repaired, the user may easily remove the case from the phone without worrying about damaging the phone or the phone case.

In some embodiments, the edge of the back plate 11 is provided with a protrusion, an inner side of the side plate 12 is provided with a groove matching the protrusion, and the back plate 11 is interlocked and cooperated with the side plate 12 through the protrusion and the groove.

In some embodiments, an outer edge of the back of the back plate 11 may be provided with a groove, an inner edge of the side plate 12 may be provided with a protrusion matching the groove, and the back plate 11 may be interlocked with the side plate 12 through the protrusion and the groove. In some embodiments, the back plate 11 may not be provided with a protrusion, only the inner side of the side plate 12 is provided with a groove, and the back plate 12 may be directly interlocked into the protrusion. The groove and the protrusion may be of a plurality of shapes. For example, the protrusion is rectangular, and the groove is rectangular.

In some embodiments, a material of the back plate 11 is PC, a material of the side plate 12 is thermoplastic polyurethane (TPU) with elasticity, and the design of the protrusion and the groove simplifies the process of assembling the phone case. During the process of assembling the phone case, a worker only needs to align the groove of the side plate with the protrusion of the back plate (or align the protrusion of the side plate with the groove of the back plate), and then gently press to realize rapid assembly, which not only improves the production efficiency but also reduces the manufacturing cost.

In some embodiments, as shown in FIG. 2, the back plate 11 includes an upper back plate 111 and a lower back plate 112, the upper back plate 111 and the lower back plate 112 are clamped together to form the back plate 11, the antenna 4 is provided between the upper back plate 111 and the lower back plate 112, and a connecting hole connecting the receiving area is provided in the upper back plate 111.

In some embodiments, a material of the upper back plate 111 and a material of the lower back plate 112 may be the same or different. The upper back plate 111 is parallel to the lower back plate 112, the upper back plate 111 is disposed on an inner side near the back of the phone, the lower back plate 112 is disposed on an outer side away from the back of the phone. There is a receiving space between the upper back plate 111 and the lower back plate 112, and the antenna 4 is provided in the receiving space.

The connecting hole refers to an opening hole that connects sidewalls of the receiving area (e.g., the second receiving groove 52). In some embodiments, one end of the antenna 4 may be connected with the phone (e.g., the phone data port), and the other end of the antenna 4 may connected with the circuit board 32 of the display module 3 by passing out the receiving space through the connecting hole, to achieve an electrical connection with the display module 3.

In some embodiments of the present disclosure, the antenna is provided between the upper back plate and the lower back plate, which may effectively avoid the antenna interfering with electronic components inside the phone, ensure the stability and clarity of the signal, and reduce an electromagnetic interference of the antenna on a battery of the phone at the same time, to improve the service life of the battery.

In some embodiments, the material of the case includes PC or acrylic. Understandably, PC and acrylic are lightweight and easy to process, which allows the case to maintain sufficient strength without adding too much weight burden to the phone. At the same time, both PC and acrylic with good plasticity and processability may be customized and processed according to different design demands to satisfy personalized demands of users. The user may see the antenna through the transparent PC and acrylic, enhancing the aesthetic appeal of the product.

In some embodiments, the case 1 may also be of any other feasible materials (e.g., one or a combination of leather, metal, silicone, polypropylene, etc.).

In some embodiments, the phone case further includes a micro memory chip (not shown in the figure) and a microprocessor chip (not shown in the figure).

The micro memory chip refers to a chip used to store a plurality of data and instructions generated by the phone case during interaction. For example, the micro memory chip may include one of an electrically erasable programmable read-only memory (EEPROM) chip, a static random-access memory (SRAM) chip, etc. In some embodiments, the micro memory chip is configured to receive and store display data transmitted by the phone via the antenna.

The microprocessor chip refers to a chip used to process a plurality of types of data and instructions generated by the phone case during interaction. For example, the microprocessor chip may include one of a power line communication (PLC) chip, a system on a chip (SoC), etc. In some embodiments, the microprocessor chip is configured to obtain monitoring data, determine display parameters based on the monitoring data, and generate a parameter regulation instruction based on the display parameters and send the parameter regulation instruction to the display module to control the display module to display content based on the display parameters.

In some embodiments, the micro memory chip, the microprocessor chip, and the circuit board 32 are electrically connected, and the antenna 4 is electrically connected with the circuit board 32 so that the antenna 4 may transmit the plurality of types of data (e.g., the monitoring data and the display data) and instructions (e.g., the parameter regulation instruction) generated by the phone and/or the phone case during the interaction to the micro memory chip and the microprocessor chip.

Figure 5:
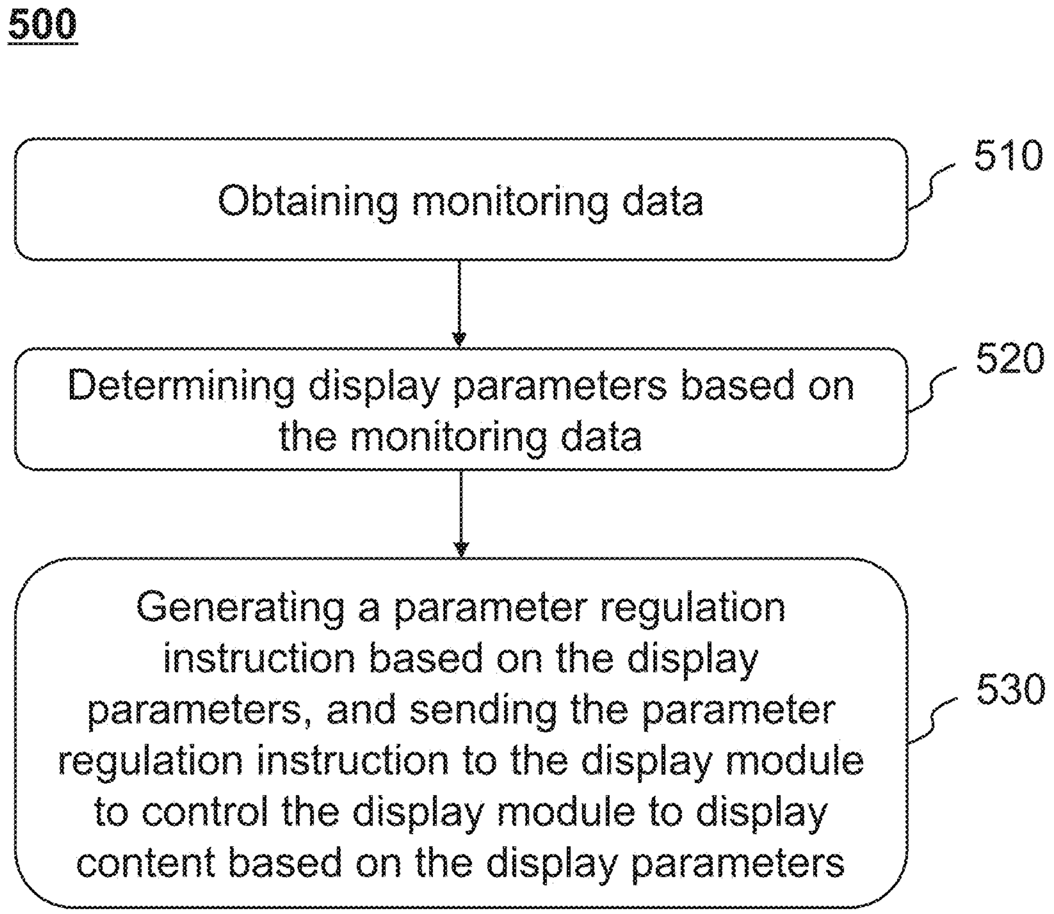
FIG. 5 is flowchart illustrating an exemplary method for determining a display content according to some embodiments of the present disclosure.

FIG. 5 is a flowchart illustrating an exemplary method for determining a display content according to some embodiments of the present disclosure. In some embodiments, a process 500 may include operations 510-530. In some embodiments, process 500 may be executed by the microprocessor chip.

In 510, monitoring data is obtained.

The monitoring data refers to monitored data related to an environment in which the phone case is located. In some embodiments, the monitoring data may include ambient temperature data and an ambient light intensity. The ambient temperature data refers to data related to the temperature of the environment in which the phone case is located. The ambient light intensity refers to data related to the light intensity of the environment in which the phone case is located.

In some embodiments, the microprocessor chip may obtain the monitoring data in a plurality of manners. For example, the microprocessor chip may obtain the monitoring data from sensors (e.g., a temperature sensor, a photoresistor, etc.) mounted on the phone case. As another example, the microprocessor chip may obtain the monitoring data from a phone APP (e.g., a weather service APP) via the antenna.

In 520, display parameters are determined based on the monitoring data.

The display parameters refer to parameters related to a display module when the display module displays content. For example, the display parameters may include at least one of a display brightness, a resolution, a contrast, etc.

In some embodiments, the microprocessor chip may determine the display parameters based on the monitoring data in a plurality of manners. For example, in response to determining that the ambient light intensity is less than a first threshold, the microprocessor chip may adjust the display brightness of the display module to a first display brightness. As another example, the microprocessor chip may also set a plurality of first ladder thresholds corresponding to a plurality of ambient light intensities. Each first ladder threshold corresponds to each display brightness, and the larger the value of the first ladder threshold (i.e., the larger the ambient light intensity), the larger the corresponding display brightness. The first threshold and the plurality of first ladder thresholds may be set by a person skilled in the art based on experience.

Understandably, determining the display brightness based on the ambient light intensity not only saves power, but also ensures the user experience when refreshing the display content in a low-light environment.

Similarly, for example, in response to determining that the ambient temperature data is larger than a second threshold, the microprocessor chip may adjust the display brightness of the display module to a second display brightness. As another example, the microprocessor chip may also set a plurality of second ladder thresholds corresponding to a plurality of pieces of ambient temperature data. Each second ladder threshold corresponds to each display brightness, and the larger the value of the second ladder threshold (i.e., the larger the ambient temperature is), the less the corresponding display brightness. The second threshold and the plurality of second ladder thresholds may all be set by a person skilled in the art based on experience.

Understandably, determining the display brightness based on the ambient temperature data avoids frequent refreshing or an excessive display brightness of the display module, which leads to a rapid rise in the temperature of the phone.

More descriptions regarding how the microprocessor chip determines the display parameters based on the monitoring data may be found in related descriptions hereinafter.

In 530, a parameter regulation instruction is generated based on the display parameters, and the parameter regulation instruction is sent to the display module to control the display module to display content based on the display parameters.

The parameter regulation instruction refers to an instruction related to adjusting the display parameters of the display module. In some embodiments, the microprocessor chip may generate the parameter regulation instruction automatically through a preset program based on the display parameters and send the parameter regulation instruction to the display module, to make the display module display content with the display parameters. The preset program may be set in advance by a person skilled in the art.

In some embodiments of the present disclosure, the microprocessor chip determines the display parameters based on the monitoring data, automatically generates the parameter regulation instruction, and controls the display module to display content based on the display parameters, which may give the user a better display effect without affecting the user experience.

In some embodiments, the display parameters include a refresh rate of the display module. The microprocessor chip is further configured to determine the refresh rate based on the monitoring data, a user activity, and a module power.

The user activity is used to determine whether the user is using a phone. For example, the user activity of 1 indicates that the user is using the phone, and the user activity of 0 indicates that the user is not using the phone.

The module power refers to a power of the phone case (e.g., the display module).

The refresh rate refers to a count of times the display module refreshes patterns per unit time. For example, the display module refreshes the patterns 60 times per unit time, which means that the refresh rate is 60 Hz. When the refresh rate is 0 Hz, the display content of the display module is frozen.

In some embodiments, in response to determining that the ambient light intensity is less than a preset light intensity threshold, the microprocessor chip may determine the refresh rate based on the ambient light intensity, the user activity, and the module power by querying a first preset table or by a first preset equation. The preset light intensity threshold may be set by a person skilled in the art based on experience.

For example, the microprocessor chip may query the first preset table based on the current ambient light intensity, the user activity, and the module power, determine a sum of differences of the current ambient light intensity, the user activity, and the module power, with a reference ambient light intensity, a reference user activity, and a reference module power, which is less than a preset difference threshold, and determine a reference refresh rate corresponding to the reference ambient light intensity, the reference user activity, and the reference module power to be the current refresh rate of the display module.

The first preset table may be constructed based on historical data. The first preset table includes an actual ambient light intensity (i.e., the reference ambient light intensity), an actual user activity (i.e., the reference user activity), an actual module power (i.e., the reference module power) of a sample display module in a plurality of environments, and an actual refresh rate (i.e., the reference refresh rate) corresponding to the actual ambient light intensity, the actual user activity, and the actual module power. The preset difference threshold may be set by a person skilled in the art based on experience.

As another example, the microprocessor chip may determine the refresh rate by the first preset equation. For example, the refresh rate may be negatively correlated with the user activity and positively correlated with the ambient light intensity and the module power. Merely by way of example, the first preset equation may be: the refresh rate=$w_1$×ambient light intensity+$w_2$×user activity+$w_3$×module power. $w_1$, $w_2$, and $w_3$ are a light intensity coefficient, an activity coefficient, and a power coefficient, respectively, where $w_1$ and $w_3$ are positive, and $w_2$ is negative.

In some embodiments, in response to determining that the ambient temperature data is larger than a preset temperature threshold, the microprocessor chip may determine the refresh rate based on the ambient temperature data, the user activity, and the module power by querying a second preset table or by a second preset equation. The preset temperature threshold may be set by a person skilled in the art based on experience. The manner of determining the refresh rate by querying the second preset table or by the second preset equation is similar to the manner of determining the refresh rate by querying the first preset table or by the first preset equation, which is not repeated here.

Understandably, when the ambient light intensity is less than the preset light intensity threshold and the ambient temperature data is larger than the preset temperature threshold, the microprocessor chip may obtain two refresh rates (i.e., the refresh rate corresponding to the ambient light intensity and the refresh rate corresponding to the ambient temperature data) at the same time, and select the refresh rate with the smallest value between the two refresh rates as the current refresh rate of the display module and applied to the display module.

In some embodiments of the present disclosure, determining the refresh rate based on the ambient light intensity and the ambient temperature data may save power while avoiding the display module from frequently refreshing the display content in a low-light environment or at a higher temperature, which makes a light of the display module change too fast or a temperature of the phone rise too fast, thereby improving the user experience.

In some embodiments, the microprocessor chip is further configured to obtain device data and determine the display parameters based on the device data and the monitoring data.

The device data refers to data related to the phone. For example, the device data may include a phone temperature, a phone brightness, a phone power, a phone display mode (e.g., whether the phone display mode is an eye protection mode), etc. In some embodiments, the device data may be transmitted to the microprocessor chip via the antenna.

In some embodiments, the microprocessor chip may determine the display parameters in a plurality of manners based on the device data and the monitoring data. For example, the microprocessor chip may determine the display brightness and the refresh rate, etc., of the display module under the ambient temperature data (or the ambient light intensity), the phone temperature, and the phone brightness by querying a third preset table or by a third preset equation. For example, the display brightness and the refresh rate of the display module may be negatively correlated with the phone temperature and positively correlated with the phone brightness.

The third preset table may be constructed based on historical data. The third preset table includes a plurality of actual phone temperatures and a plurality of actual phone brightnesses, and a plurality of actual display brightnesses and a plurality of actual refresh rates corresponding to the plurality of actual phone temperatures and the plurality of actual phone brightnesses for a sample phone under a plurality of pieces of ambient temperature data (or a plurality of ambient light intensities). The manner of determining the display brightness and the refresh rate of the display module by querying the third preset table or by the third preset equation is similar to the manner of determining the refresh rate by querying the first preset table or by the first preset equation, which is not repeated herein.

As another example, the microprocessor chip may construct a display feature vector based on the device data, the monitoring data, and the user activity, and query a vector database based on the display feature vector, determine reference display parameters corresponding to a reference display feature vector whose distance from the display feature vector is less than a preset distance threshold to be the display parameters.

The vector database includes a plurality of reference display feature vectors and a plurality of reference display parameters corresponding to the plurality of reference display feature vectors. In some embodiments, the vector database may be constructed based on an experiment. Merely by way of example, the vector database is constructed as follows.

In S1, actual device data, actual monitoring data, and actual user activity are obtained and designated as reference display feature vectors in the experiment.

In S2, a plurality of sets of actual display parameters are used in the experiment under any one reference display feature vector, and a set of actual display parameters with a highest or equalized actual brightness and actual refresh frequency (e.g., a dropping magnitude of the phone power is less than a power threshold) among the plurality of sets of actual display parameters in which an increasing magnitude of the phone temperature is less than a temperature threshold (or the user evaluates not affecting the use of the phone) during a preset time period is selected as the reference display parameters.

In S3, a plurality of reference display feature vectors and a plurality of reference display parameters corresponding to the plurality of reference display feature vectors are put into the vector database (e.g., Milvus, Faiss, etc.). The temperature threshold and the power threshold may be set by a person skilled in the art based on experience.

In some embodiments of the present disclosure, comprehensively considering the device data of the phone to determine the display parameters may improve the display effect of the display module and further improve the user experience.

In some embodiments, the microprocessor chip is further configured to determine at least one set of display parameters based on data to be displayed, the device data, and the monitoring data.

The data to be displayed refers to data related to content to be displayed by the display module. For example, the data to be displayed may be one or more contents to be displayed. Each data to be displayed corresponds to a set of display parameters. In some embodiments, the data to be displayed may be candidate display data or a display data sequence. More descriptions regarding the candidate display data and the display data sequence may be found in FIG. 6 and the related description thereof.

In some embodiments, the microprocessor chip may determine the display data in a plurality of manners. For example, the microprocessor chip may input at least one piece of data to be displayed, the device data, the monitoring data, and a manually adjusted record to a parameter determination model, and the parameter determination model may output the at least one set of display parameters corresponding to the at least one piece of data to be displayed.

The manually adjusted record refers to an adjusted record manually made by the user in the past. For example, the manually adjusted record may include an adjusted display brightness, an adjusted contrast, etc. In some embodiments, the manually adjusted record may be synchronously stored in the micro memory chip, and the microprocessor chip may read the manually adjusted record directly from the micro memory chip.

In some embodiments, the parameter determination model may be a machine learning model. For example, the parameter determination model may be a convolutional neural network (CNN), etc.

In some embodiments, a remote server may input a plurality of first samples with a plurality of first labels into an initial parameter determination model, construct a loss function through the plurality of first labels and results output by the initial parameter determination model, iteratively update parameters of the initial parameter determination model based on the loss function by a gradient descent algorithm, etc. The model training is completed when a preset training condition is satisfied, and a trained parameter determination model is obtained. The preset training condition may include that the loss function converges, a count of iterations reaches a threshold, etc. The trained parameter determination model may be ported to the microprocessor chip or the phone.

The first samples may include sample data to be displayed, sample device data, sample monitoring data, and a sample manually adjusted record. The first labels may include actual display parameters corresponding to the first samples.

In some embodiments, the first samples and the first labels may be obtained in a plurality of manners. For example, the first samples may be obtained based on historical data, and the first labels may be the actual display parameters manually selected by the user under the condition of the first samples. As another example, a technician may conduct experiments, take experimental data to be displayed, experimental device data, experimental monitoring data, and an experimental manually adjusted record in the experiments as the first samples, obtain the a plurality of sets of experimental display parameters, and select a set of experimental display parameters that satisfies a preset condition among the plurality of sets of experimental display parameters as the first label. The preset condition may include that an increasing magnitude of the phone temperature is less than a temperature threshold, a rating from the user is not less than a rating threshold, etc. The temperature threshold and the rating threshold may be set by a person in art based on experience.

In some embodiments of the present disclosure, determining the display parameters in combination with the performance of the device, the ambient conditions, and the usage habits of the user may further optimize the display effect and improve the sense of user experience.

In some embodiments, the e-ink screen is configured to display a target pattern. The microprocessor chip is further configured to obtain a user preference level and time information and determine the display data based on the user preference level and the time information.

The user preference level is used to reflect a user preference for the display data. The display data refers to the content the display module needs to display. For example, the display data may include a picture, a text, time, etc.

In some embodiments, the microprocessor chip may determine the user preference level in a plurality of manners. For example, the microprocessor chip determines the user preference level based on a historical display record by a preset algorithm, a preset software, or a big data model.

Merely by way of example, the microprocessor chip may obtain the historical display record of a plurality of pieces of display data manually set by the user through a circuit board (e.g., the circuit board 32) or connecting to a Bluetooth of the phone, etc., and determine a display count, a display time point, a display duration, etc., of each display data by the historical display record, thereby determining the user preference level. For example, the user preference level may be positively correlated with the display count and the display duration of the display data. Merely by way of example, the user preference level=$a_1$×the display count+$a_2$× an average display duration. $a_1$ denotes a display count coefficient and $a_2$ denotes a display duration coefficient, where $a_1$ and $a_2$ are positive, and the specific values of $a_1$ and $a_2$ may be set by a person skilled in the art based on experience.

Furthermore, the microprocessor chip may determine and update the user preference level at each time period with a preset time period, to assess the user preference for the display data at different time periods. For example, the user preference ranking for 10:00 to 12:00 is a picture 1, a picture 2, a text 1, etc., and the preference ranking for 14:00 to 16:00 is time, a text 2, etc. In some embodiments, the microprocessor chip may regularly update a user preference level during a second time period based on a historical display record during a first time period. The first time period is earlier than the second time period.

The time information refers to a period during which the display module displays content. In some embodiments, the microprocessor chip may read the time information directly from the micro memory chip.

In some implementations, the microprocessor chip may select the display data corresponding to the user preference level with the largest value among a plurality of user preference levels as the current display data to display based on the plurality of user preference levels corresponding to current time information.

In some embodiments of the present disclosure, determining the display data based on the user preference and the time information may make the content displayed at each time period more targeted and improve the user experience.

In some embodiments, the microprocessor chip is further configured to obtain candidate display data, determine a preference score corresponding to the candidate display data based on the user preference level, the time information, the candidate display data, and the device data through a preference model, and determine the display data based on the preference score.

The candidate display data refers to display data that is candidate for display. For example, the candidate display data may include one of display data displayed by the display module, display data recommended by an APP to the user, display data that is selected by other users more frequently than a count threshold in the same time period or has a display duration larger than a duration threshold, display data in a preset favority or a display database preset by the user, etc. APP may recommend the display data based on geographic location information and weather data, etc., in which the user is located, combined with display data set by other users under the same geographic location information and weather data.

In some embodiments, the preference model is a machine learning model. For example, the preference model may be a convolutional neural network (CNN), etc.

Figure 6:
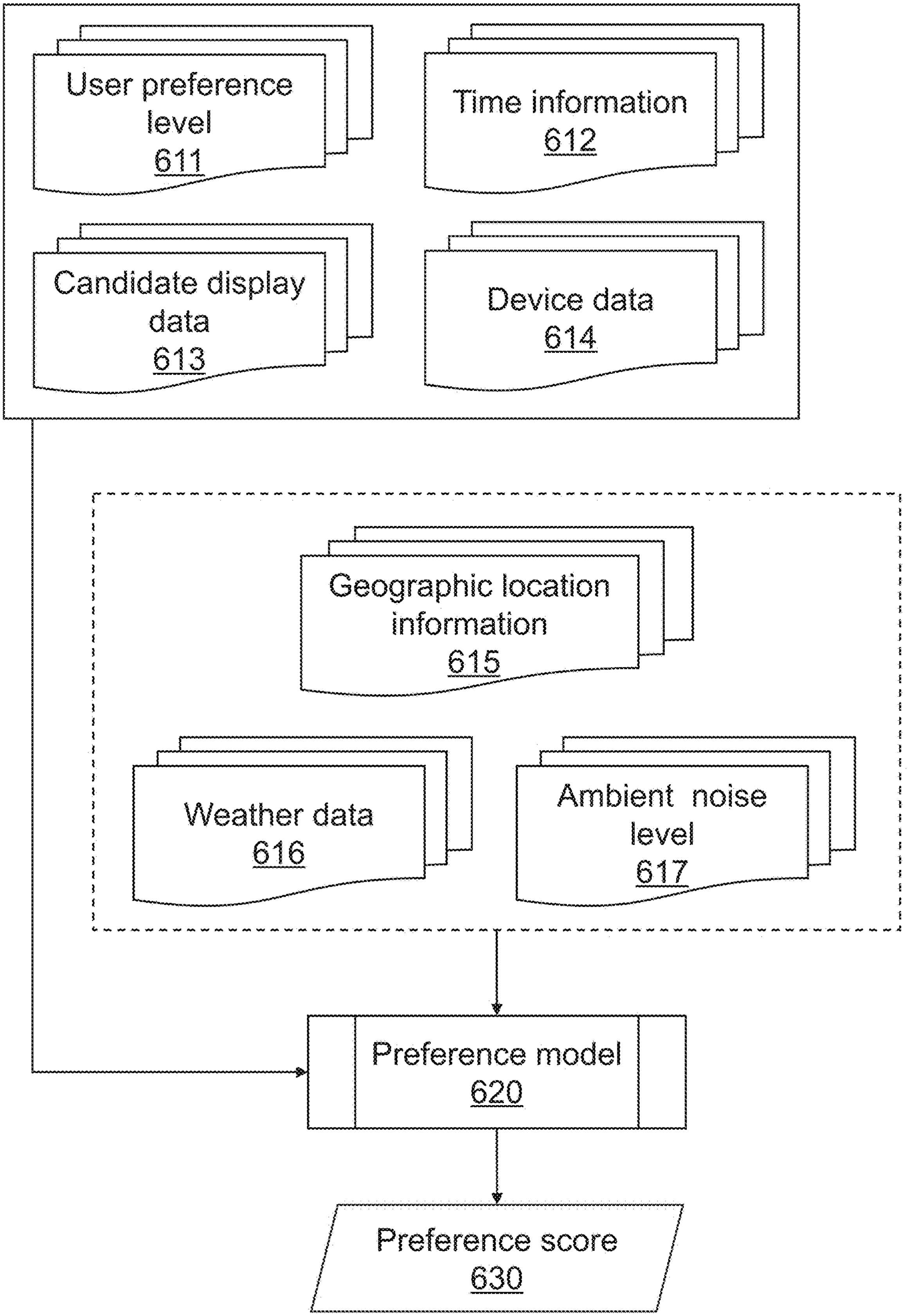
FIG. 6 is a schematic diagram illustrating a preference model according to some embodiments of the present disclosure.

FIG. 6 is a schematic diagram illustrating a preference model according to some embodiments of the present disclosure.

As shown in FIG. 6, inputs to a preference model 620 may include a user preference level 611, time information 612, candidate display data 613, and device data 614, and an output of the preference model 620 may include a preference score 630 corresponding to the candidate display data 613. The preference score refers to the score of the user prefers the content displayed by the display module.

In some embodiments, the preference model may be obtained by training a plurality of second samples with a plurality of second labels. The manner of training the preference model is similar to the manner of training the parameter determination model, which is not repeated herein.

In some embodiments, the second samples may include a sample user preference level, sample time information, a sample candidate display parameter, and sample device data. The second labels may include an actual preference score corresponding to the second sample.

In some embodiments, the second samples may be obtained based on historical data. The second labels may be obtained by the user evaluating or scoring the second samples. For example, the user may evaluate the candidate display data with a star evaluation (e.g., 1 to 5 stars) in an evaluation system of a corresponding phone APP. As another example, the user evaluates candidate display data as "like" or "dislike" in the corresponding phone APP. If the user clicks on the "like" button, the second label corresponding to the candidate display data is 1; if the user clicks on the "dislike" button, the second label corresponding to the candidate display data is 0. As yet another example, if the user manually switches during the time period in which the candidate display data is displayed, a second label corresponding to the candidate display data is 0 (i.e., "dislike").

Alternatively, if the user manually adds the candidate display data during the time period, a second label corresponding to the added candidate display data is 1 (i.e., "like").

In some embodiments, the microprocessor chip may sort a plurality of preference scores corresponding to a plurality of pieces of candidate display data from high to low to obtain a display data sequence and designate the display data sequence as the display data. The display module displays contents based on the display data sequence.

In some embodiments of the present disclosure, determining the plurality of preference scores corresponding to the plurality of pieces of candidate display data by the trained preference model, and then displaying the contents sequentially based on the plurality of preference scores, may make the contents displayed by the display module more targeted, thereby further improving the user experience.

In some embodiments, the inputs to the preference model 620 further include geographic location information 615, weather data 616, and an ambient noise level 617.

The geographic location information refers to information related to a geographic location where the phone or the phone case is located. The weather data refers to data related to a weather in the geographic location where the phone or the phone case is located. The ambient noise level refers to noise information of an environment where the phone or the phone case is located.

In some embodiments, the microprocessor chip may obtain the geographic location information, the weather data, and the ambient noise level via a phone APP. For example, the microprocessor chip may obtain the geographic location information and the weather data via a weather service APP, obtain an ambient audio via an audio input APP and convert an audio signal into a frequency domain signal, and analyze an energy distribution in different frequency domain ranges to identify the ambient noise level.

In some embodiments, the second samples may further include sample geographic location information, sample weather data, and a sample ambient noise level.

The preference model may determine a display preference and a display content of the user under different geographic location information, weather data, and ambient noise levels. For example, the preference model may display an umbrella reminder on a cloudy day and an ultraviolet index on a sunny day. As another example, the preference model may determine whether the user prefers a simple text message or a complex pattern in a noisy environment.

In some embodiments of the present disclosure, the geographic location information, the weather data, and the ambient noise level are further used as inputs to the preference model, so that the preference model can further synthesize the effect of the geographic location information, the weather data, and the ambient noise level on the user preference, thereby improving prediction accuracy. Therefore, more accurate display contents are sent to the user, which makes the display contents more targeted, thus effectively improving the user experience.

In some embodiments, the preference model is trained on a remote server and configured in the remote server and/or the microprocessor chip. The microprocessor chip is further configured to determine a data processing location based on a count of the candidate display data and a user intervention record.

The remote server refers to a computer server located in a remote location. In some embodiments, the phone and/or the microprocessor chip may access the remote server via the network, and download a plurality of trained models (e.g., the preference model and/or the parameter determination model). In some embodiments, the preference model may operate in the phone (e.g., a processor of the phone), in the microprocessor chip in the phone case, or even dynamically scheduled.

The user intervention record refers to a record of user manual intervention in the display data. For example, the user intervention record may include a frequency of the user intervention in the display data.

The data processing location refers to a location where the preference model processes the data. For example, the data processing location may be at least one of a preference model configured in the phone (e.g., the processor) or the preference model on the microprocessor chip.

In some embodiments, the microprocessor chip or the phone may determine the data processing location in a plurality of manners. For example, the phone may provide a location option for the user to autonomously select the data processing location. As another example, the microprocessor chip or the phone may determine the data processing location based on the count of the candidate display data, the frequency of the user intervention in the display data, etc. The greater the count of the candidate display data and the higher the frequency of the user intervention in the display data, the greater the tendency of utilizing the preference model configured in the phone for data processing.

In some embodiments of the present disclosure, a count of computation of the microprocessor chip and the internal processor of the phone may be reduced by training the preference model at the remote server. In addition, selecting the data processing location based on the count of the candidate display data and the user intervention record may ensure the efficiency of data processing.

It should be noted that the foregoing description of the process in question is for the purpose of exemplification and illustration only and does not limit the scope of application of the present disclosure. For a person skilled in the art, various corrections and changes can be made to the process under the guidance of the present disclosure. However, these corrections and changes remain within the scope of the present disclosure.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and amendments are intended to be suggested by this disclosure and are within the spirit and scope of the exemplary embodiments of the present disclosure.

What is claimed is:

1. A phone case with magnetic and display functions, comprising:

a case, a magnetic ring, a display module, and an antenna, wherein a middle of a back side of the case is provided with a first receiving groove for accommodating the magnetic ring, the magnetic ring is disposed in the first receiving groove, a middle of the first receiving groove is also provided with a receiving area for accommodating the display module, and the display module is disposed in the receiving area;

the case is provided with the antenna, and the antenna is electrically connected with the display module;

the receiving area is a second receiving groove, and the display module is disposed within the second receiving groove;

the display module includes a display and a circuit board, and the circuit board is located below the display;

the display is electrically connected with the circuit board, and the antenna is electrically connected with the circuit board; and the second receiving groove is an annular groove, and a shape and a size of the display match a shape and a size of the second receiving groove respectively.

2. The phone case of claim 1, wherein the display is an e-ink screen.

3. The phone case of claim 1, wherein a top of the display module is provided with a protective layer, and a surface of the protective layer is level with a surface of the magnetic ring.

4. The phone case of claim 1, wherein the case includes a back plate and a side plate provided around a circumference of the back plate, an edge of the back plate is connected with the side plate, and the antenna is provided within the back plate.

5. The phone case of claim 4, wherein the edge of the back plate is provided with a protrusion, an inner side of the side plate is provided with a groove matching the protrusion, and the back plate is interlocked and cooperated with the side plate through the protrusion and the groove.

6. The phone case of claim 4, wherein the back plate includes an upper back plate and a lower back plate, the antenna is provided between the upper back plate and the lower back plate, and a connecting hole connecting the receiving area is provided in the upper back plate.

7. The phone case of claim 1, wherein:

a material of the case includes polycarbonate (PC) or acrylic.

8. The phone case of claim 1, further comprising:

a micro memory chip and a microprocessor chip, wherein the micro memory chip is configured to receive and store display data transmitted by a phone via the antenna; and the microprocessor chip is configured to:

obtain monitoring data;

determine display parameters based on the monitoring data; and generate a parameter regulation instruction based on the display parameters and send the parameter regulation instruction to the display module to control the display module to display content based on the display parameters.

9. The phone case of claim 8, wherein the display parameters include a refresh rate of the display module; and the microprocessor chip is further configured to:

determine the refresh rate based on the monitoring data, a user activity, and a module power.

10. The phone case of claim 8, wherein the microprocessor chip is further configured to:

obtain device data; and determine the display parameters based on the device data and the monitoring data.

11. The phone case of claim 10, wherein the microprocessor chip is further configured to:

determine at least one set of display parameters based on data to be displayed, the device data, and the monitoring data.

12. The phone case of claim 2, further comprising:

a microprocessor chip; and the e-ink screen being configured to display a target pattern, wherein the microprocessor chip is further configured to:

obtain a user preference level and time information; and determine the display data based on the user preference level and the time information.

13. The phone case of claim 12, wherein the microprocessor chip is further configured to:

obtain candidate display data;

determine a preference score corresponding to the candidate display data based on the user preference level, the time information, the candidate display data, and the device data through a preference model, the preference model being a machine learning model; and determine the display data based on the preference score.

14. The phone case of claim 13, wherein inputs to the preference model further include geographic location information, weather data, and an ambient noise level.

15. The phone case of claim 14, wherein the preference model is trained on a remote server and configured in the remote server and/or the microprocessor chip; and the microprocessor chip is further configured to:

determine a data processing location based on a count of the candidate display data and a user intervention record.

* * * * *